(12) United States Patent
Nakamura et al.

(10) Patent No.: US 10,909,748 B2
(45) Date of Patent: Feb. 2, 2021

(54) IMAGE PROJECTION METHOD AND IMAGE PROJECTION DEVICE FOR THREE-DIMENSIONAL OBJECT FOR PROJECTION

(71) Applicant: PANASONIC INTELLECTUAL PROPERTY MANAGEMENT CO., LTD., Osaka (JP)

(72) Inventors: Hideyuki Nakamura, Fukuoka (JP); Ryuji Fuchikami, Fukuoka (JP); Ikuo Fuchigami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/088,723

(22) PCT Filed: Mar. 30, 2017

(86) PCT No.: PCT/JP2017/013139
§ 371 (c)(1),
(2) Date: Sep. 26, 2018

(87) PCT Pub. No.: WO2017/179432
PCT Pub. Date: Oct. 19, 2017

(65) Prior Publication Data
US 2019/0108673 A1   Apr. 11, 2019

(30) Foreign Application Priority Data

Apr. 13, 2016   (JP) ................. 2016-080595

(51) Int. Cl.
*G06T 15/20*       (2011.01)
*G09G 5/36*        (2006.01)
(Continued)

(52) U.S. Cl.
CPC .............. *G06T 15/20* (2013.01); *G03B 21/14* (2013.01); *G06T 3/005* (2013.01); *G06T 11/60* (2013.01);
(Continued)

(58) Field of Classification Search
CPC ...................................................... G06T 15/20
(Continued)

(56) References Cited

U.S. PATENT DOCUMENTS 7,845,799 B2   12/2010   Kubara et al.
9,832,436 B1   11/2017   Fuchikami et al.
(Continued)

FOREIGN PATENT DOCUMENTS

JP   2015-173430 A   10/2015

OTHER PUBLICATIONS

Raskar, R., Welch, G., & Chen, W. (1999). Table-top spatially-augmented realty: bringing physical models to life with projected imagery. Proceedings 2nd IEEE and ACM International Workshop on Augmented Reality (IWAR'99), 64-71. (Year: 1999).*
(Continued)

*Primary Examiner* — Shivang I Patel
(74) *Attorney, Agent, or Firm* — Greenblum & Bernstein, P.L.C.

(57) ABSTRACT

A projection device viewpoint image of a three-dimensional projection target is acquired, a three-dimensional model corresponding to the projection target is prepared as projection contents, the three-dimensional model is converted into a two-dimensional image that coincides with the projection device viewpoint image, and the two-dimensional image that coincides with the projector viewpoint image is projected to the projection target.

12 Claims, 4 Drawing Sheets

(51) Int. Cl.
*G06T 3/00* (2006.01)
*G09G 5/00* (2006.01)
*H04N 5/74* (2006.01)
*G03B 21/14* (2006.01)
*G06T 11/60* (2006.01)
*H04N 9/31* (2006.01)

(52) U.S. Cl.
CPC .................. *G09G 5/00* (2013.01); *G09G 5/36* (2013.01); *H04N 5/74* (2013.01); *H04N 9/3185* (2013.01); *G06T 2200/24* (2013.01)

(58) Field of Classification Search
USPC ........................................................ 345/419
See application file for complete search history.

(56) References Cited

U.S. PATENT DOCUMENTS

| | | | |
|---|---|---|---|
| 2013/0155060 A1 | 6/2013 | Arrizabalaga et al. | |
| 2015/0332508 A1* | 11/2015 | Jovanovic | G06T 15/20 345/427 |
| 2015/0348313 A1* | 12/2015 | Fuchikami | G06T 15/20 348/333.01 |
| 2017/0078631 A1 | 3/2017 | Fuchikami et al. | |
| 2018/0188020 A1 | 7/2018 | Fuchikami | |

OTHER PUBLICATIONS

International Search Report issued in International Bureau of WIPO Patent Application No. PCT/JP2017/013139, dated Jun. 27, 2017.

* cited by examiner

IMAGE PROJECTION METHOD AND IMAGE PROJECTION DEVICE FOR THREE-DIMENSIONAL OBJECT FOR PROJECTION

TECHNICAL FIELD

The present disclosure relates to an image projection method and an image projection apparatus for projecting projection contents to a three-dimensional projection target.

BACKGROUND ART

Projection mapping is known as a technology for projecting movie contents to a three-dimensional projection target, such as a building. According to the technology, it is necessary to project projection contents to the projection target without positional deviation and distortion included in the projection target. For example, Patent Literature 1 discloses a method of accurately positioning projection contents by providing an imaging function in a system for projection mapping, acquiring coordinate conversion information of a projection device and an imaging device, and creating an image from a viewpoint of the projection device.

However, since two-dimensional image is used for the projection contents while the projection target is three-dimensional in the projection mapping, it is necessary to prepare projection contents for each projection device, and significant time and efforts are required for creating the projection contents. When a plurality of projection devices disposed at different positions are used in order to secure a necessary amount of light at the time of the projection and to avoid occurrence of unnatural shade due to projection light blocked by a part of the projection target, significant time and efforts are required for performing positioning such that the two-dimensional projection contents projected from the different projection devices can be projected on the projection target with no deviation. Further, it is difficult to arrange the two-dimensional projection contents with no positional deviation from the three-dimensional projection target in some cases depending on accuracy of the projection contents.

If the arrangement of the projection devices or the position of the projection target is changed, it is necessary to greatly modify the projection contents, significant time and efforts are required to adapt the projection contents to the projection target again.

An object of the present disclosure is to accurately and easily execute generation and positioning of the projection contents when the projection contents are projected to the three-dimensional projection target such as a building.

Also, an object of the present disclosure is to accurately and easily execute generation and positioning of a projection image even of the position of the projection device or the position of the projection target moves.

CITATION LIST

Patent Literature

PTL 1: Japanese Patent Unexamined Publication No. 2015-173430

SUMMARY OF THE INVENTION

According to the present disclosure, there is provided an image projection method for projecting an image to a three-dimensional projection target, the method including: acquiring a projection device viewpoint image of the three-dimensional projection target; preparing a three-dimensional model corresponding to the projection target as projection contents; converting the three-dimensional model into the two-dimensional image such that the three-dimensional model and the projection device viewpoint image coincide with each other; and projecting the two-dimensional image to the projection target.

According to the present disclosure, there is provided an image projection apparatus for projecting an image to a three-dimensional projection target, the apparatus including: a coordinate correspondence calculation unit that calculates coordinate correspondence between an imaging device and a projection device; a projection device viewpoint image generation unit that generates a projection device viewpoint image of a three-dimensional projection target; a three-dimensional model unit that stores or receives, as projection contents, a three-dimensional model corresponding to the projection target; a parameter calculation unit that calculates a parameter for converting the three-dimensional model such that the projection device viewpoint image and the three-dimensional model coincide with each other; a three-dimensional model depiction unit that generates a two-dimensional image on the basis of the parameter; an overlaid image creation unit that creates an image with the projection device viewpoint image obtained by the projection device viewpoint image generation unit and the two-dimensional image obtained by the three-dimensional model depiction unit mutually overlaid; and a projection image creation unit that outputs the two-dimensional image as a two-dimensional projection image that can be output from a projector.

According to the present disclosure, it is possible to accurately and easily execute creation and positioning of projection contents even if the position of the projection device is changed or if a plurality of projection devices are used when the projection contents are projected to a three-dimensional projection target such as a building.

DESCRIPTION OF EMBODIMENT

Figure 1:
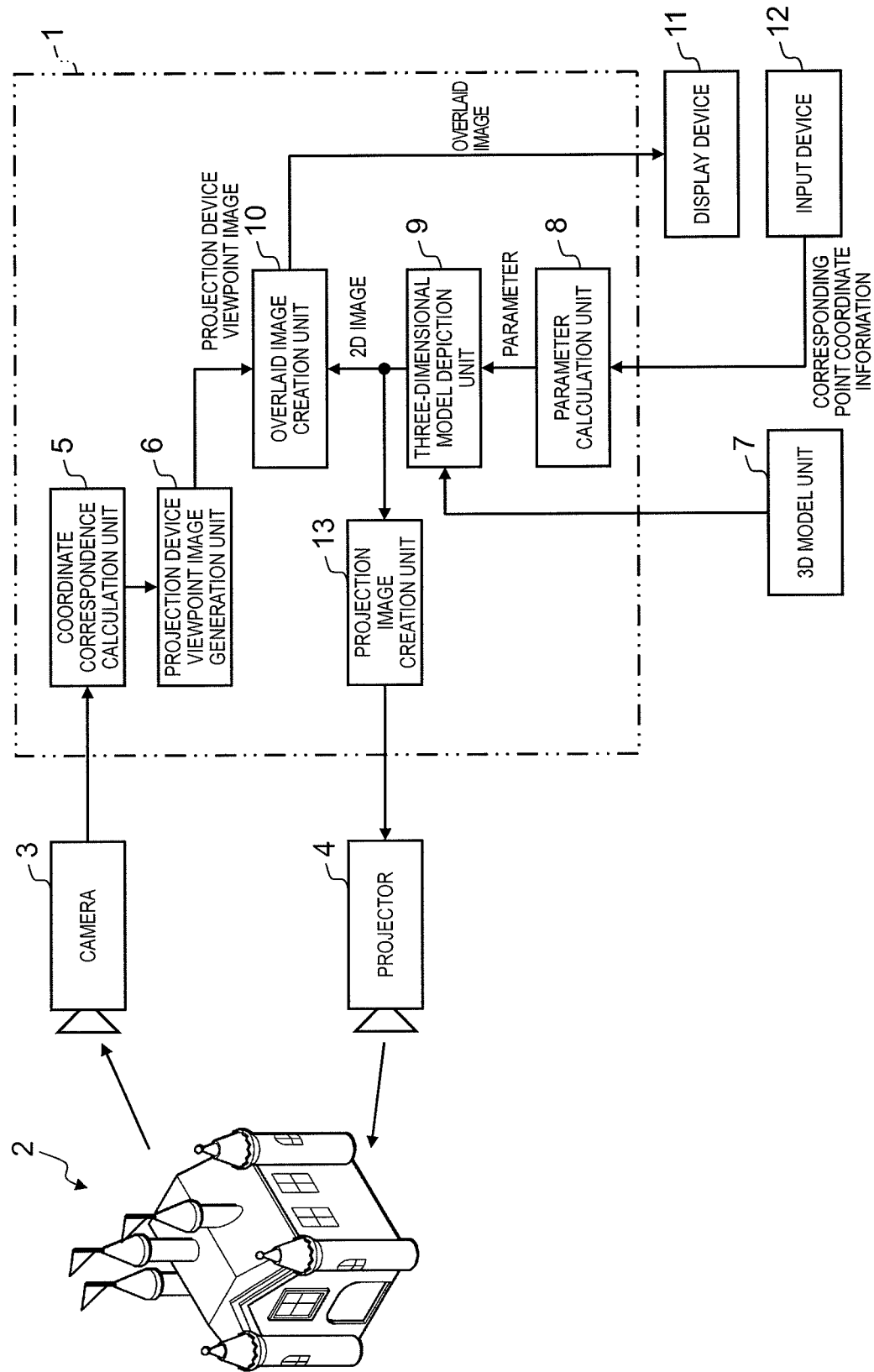
FIG. 1 is a block diagram illustrating an embodiment of an image projection apparatus according to the present disclosure.
Figure 2:
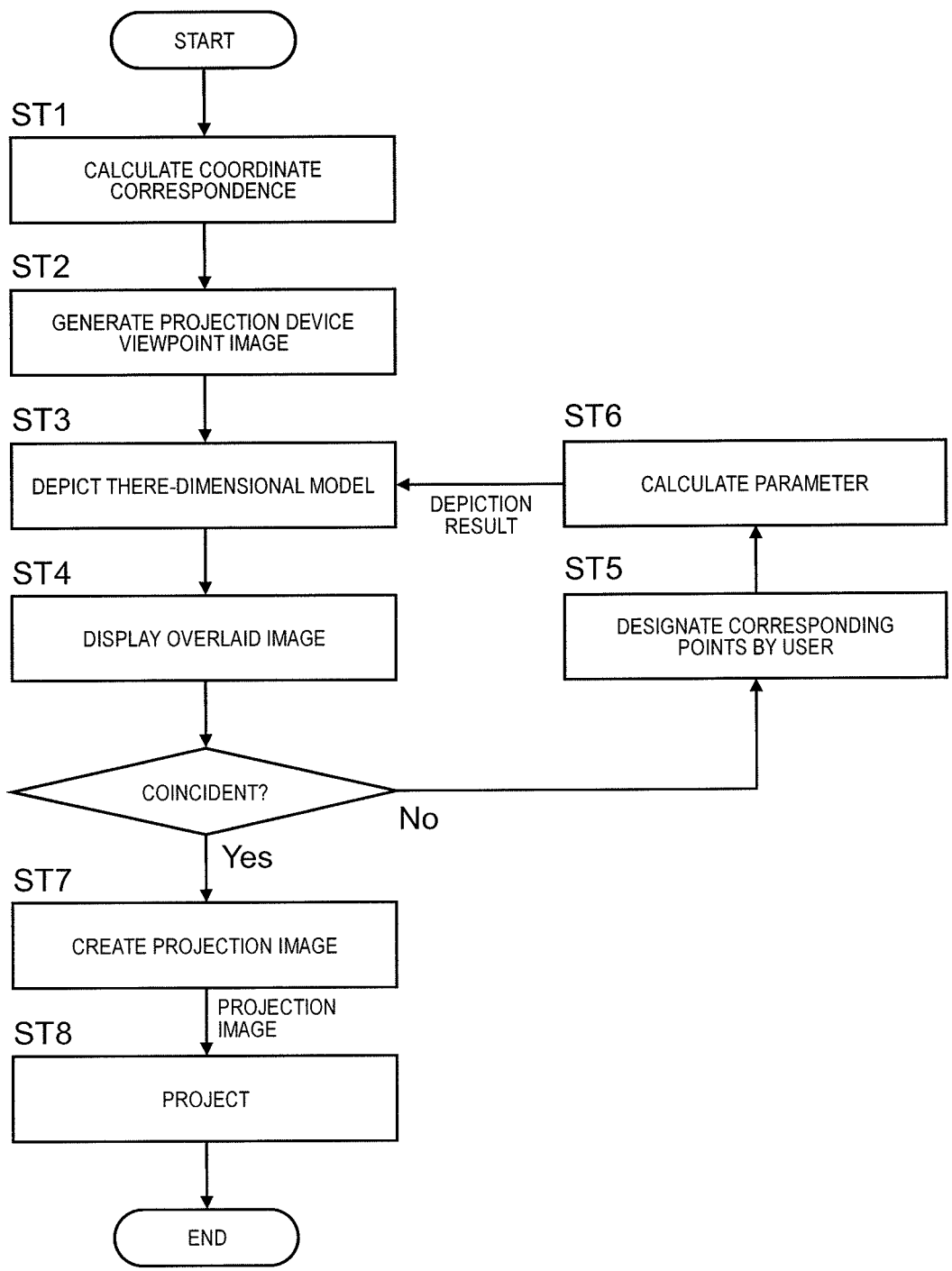
FIG. 2 is a flow diagram illustrating an embodiment of an image projection method according to the present disclosure.

Hereinafter, an embodiment of the present disclosure will be described with reference to the block diagram in FIG. 1 and the flow diagram in FIG. 2. Image processing apparatus 1 illustrated in FIG. 1 is connected to camera 3 that is directed to projection target 2 that is a building or another three-dimensional construction and to projector 4 that is similarly directed to projection target 2. Camera 3 may be digital camera and may be disposed in the vicinity of or at a location slightly far from projector 4. Although the camera 3 may be a single camera, it is preferable that camera 3 includes a plurality of cameras disposed at different positions in order to address portions hidden by projection target 2. Projector 4 may be a digital micromirror device or may be in another form, such as liquid crystal.

In any cases, it is necessary to capture coordinate correspondence information between projector 4 and camera 3, and coordinate correspondence calculation unit 5 calculates coordinate correspondence information on the basis of image data obtained by camera 3 (Step ST1). Next, projection device viewpoint image generation unit 6 creates a two-dimensional image of projection target 2 viewed from a viewpoint of projector 4 by using the coordinate correspondence information and the image captured by camera 3 (Step ST2). In practice, it is possible to acquire the projection device viewpoint image of projection target 2 by calculating the coordinate correspondence information between projector 4 and camera 3 by using a spatial coding method or a calibration pattern such as a checker pattern.

Meanwhile, the projection contents may be three-dimensional data depicted by a person such that the three-dimensional data is adapted to a three-dimensional shape of the intended projection target, data saved as three-dimensional data from a design diagram or the like of the projection target, three-dimensional data acquired by a three-dimensional measurement apparatus, or the like, and the three-dimensional data (three-dimensional model data) is stored in three-dimensional model unit 7. The data may be saved as a library in advance or may be delivered from a remote location through communication.

Projection target 2 may be obtained by printing the three-dimensional model data by a 3D printer or the like. In this manner, it is possible to realize projection with a smaller scale than the actual size.

The three-dimensional model data is converted into a two-dimensional image by three-dimensional model depiction unit 9 (Step ST3). The two-dimensional image is overlaid on the projection device viewpoint image of projection target 2 by overlaid image creation unit 10 (Step ST4). The overlaid image is displayed on display device 11 in order to encourage the operator to make a determination.

Here, what is displayed on display device 11 is a screen in which the projection device viewpoint image and the two-dimensional image obtained by three-dimensional model depiction unit 9 are displayed in a see-through manner or is a screen in which the projection device viewpoint image and the two-dimensional image obtained by converting the three-dimensional model data are displayed next to each other. It is possible to easily check deviation between projection target 2 and the projection contents by performing the positioning while viewing the screen.

The three-dimensional model depiction unit converts the three-dimensional model data into a two-dimensional image by geometric deformation represented by the following Equation.

$$w'\begin{pmatrix} x_s \\ y_s \\ 1 \end{pmatrix} = \begin{pmatrix} T_{11} & T_{12} & T_{13} & T_{14} \\ T_{21} & T_{22} & T_{23} & T_{24} \\ T_{31} & T_{32} & T_{33} & 1 \end{pmatrix} \begin{pmatrix} X_M \\ Y_M \\ Z_M \\ 1 \end{pmatrix} = T \begin{pmatrix} X_M \\ Y_M \\ Z_M \\ 1 \end{pmatrix}$$ [Math 1]

Here, (XM, YM, ZM) are three-dimensional model data, and (XS, YS) are coordinates on the projection device viewpoint image or coordinates on the projection image. T is a parameter for converting the three-dimensional model data into the two-dimensional image and includes external parameters such as parallel advancement and rotation and internal parameters such as an image angle and lens shift. Such a parameter T for performing geometric deformation is a parameter for performing projection to a three-dimensional structure without positional deviation and distortion.

Figure 3:
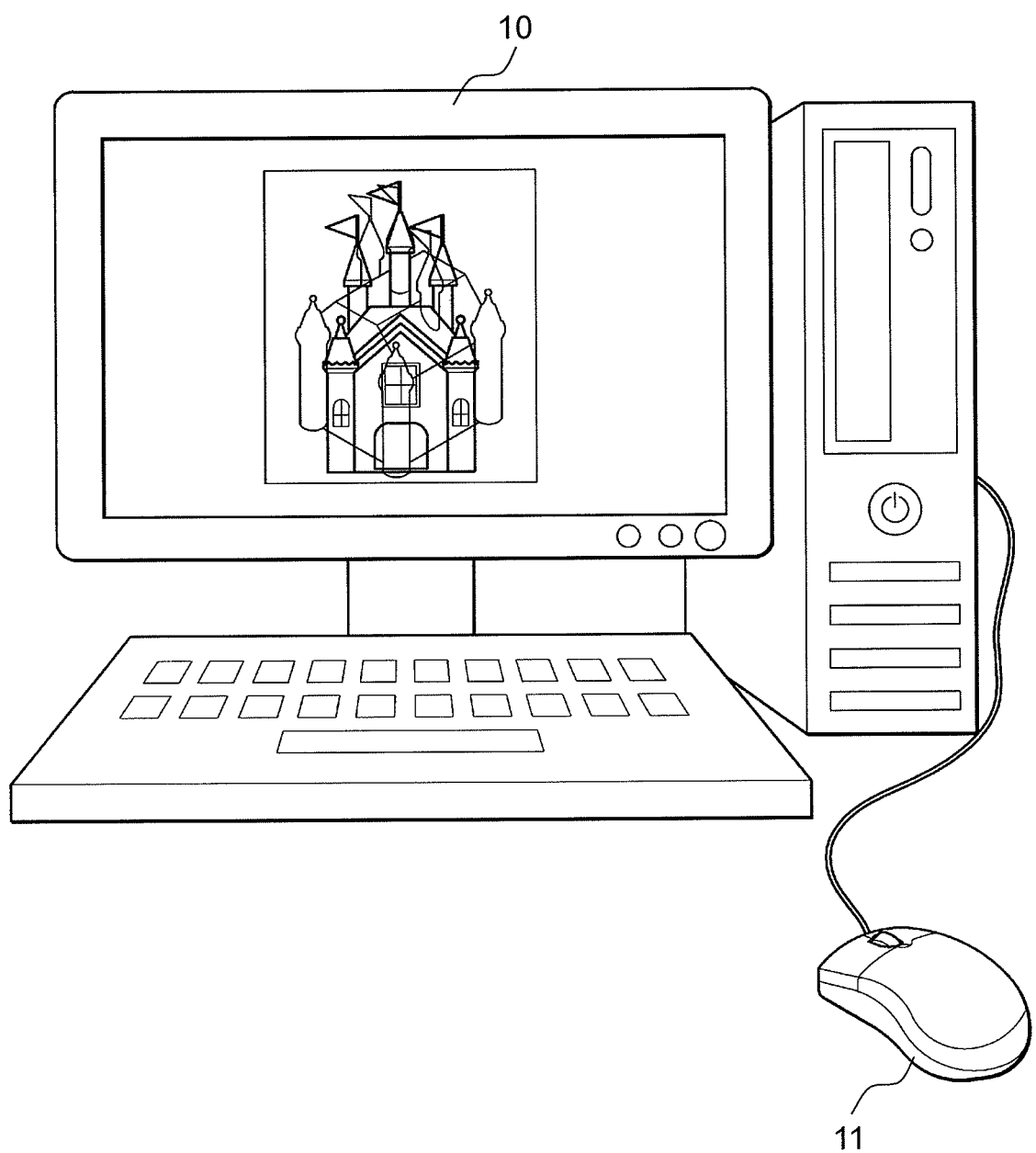
FIG. 3 is a diagram illustrating a configuration for overlaying a projection device viewpoint image and a three-dimensional model by a graphic user interface.

If at least six points are given as combinations of corresponding points between (XM, YM, ZM) and (XS, YS), it is possible to obtain T by the least square method. As a method of giving the six corresponding points, it is possible to use a procedure in which the operator matches points on the three-dimensional model and corresponding points on the projection device viewpoint image. Parameter calculation unit 8 can obtain the parameter (Step ST6) by designating the points on the 3D model displayed as a two-dimensional image and the points on the projection device viewpoint image (Step ST5) in response to an operator's command from input device 12 as illustrated in FIG. 3, for example. In this case, display device 11 displays the projection device viewpoint image and the two-dimensional image obtained by converting the three-dimensional model image in a mutually overlaid state on the same screen, the operator inputs a correction command from input device 12 while viewing the displayed overlaid image, and this procedure is repeated until required accuracy in consistency is achieved.

Even in a case in which only four or five points can be obtained as the combinations of the corresponding points between (XM, YM, ZM) and (XS, YS), it is possible to obtain an approximate solution of the parameter T by solving the least square method by the steepest descent method. Therefore, it is also possible to address a case in which a speed is required rather than the accuracy in the positioning of movie contents.

The thus obtained two-dimensional image is transferred to projector 4 after being converted into an image that can be projected by projector 4 (Step ST7) by projection image creation unit 13. The thus obtained two-dimensional image is projected to projection target 2 (Step ST8).

Figure 4:
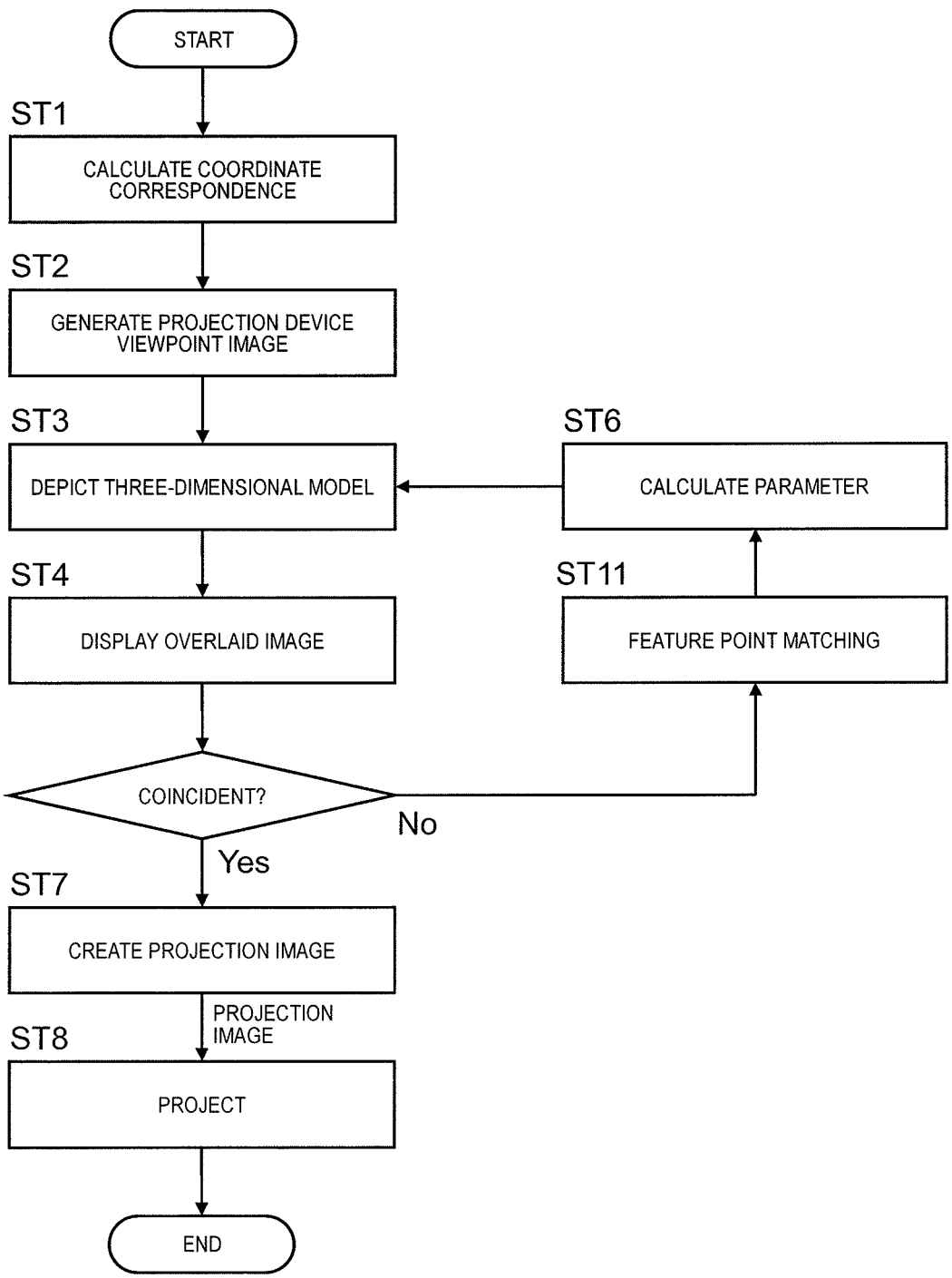
FIG. 4 is a flow diagram illustrating a modification example of the image projection method according to the embodiment.

FIG. 4 is a flow diagram illustrating a second embodiment of the present disclosure. Although most parts are similar to those illustrated in FIG. 2, the flow is different in that the step of matching the points on the three-dimensional model and the corresponding points on the projection device viewpoint image is automatically performed by feature point matching (Step ST11) without intervention of the operator.

The method of matching the projection device viewpoint image with the three-dimensional model may be a method using a phase limited correlation method in another example and is not limited thereto.

There is also a case in which the projection device viewpoint image does not completely coincide with the two-dimensional image obtained by converting the three-dimensional model depending on accuracy of the three-dimensional model. In that case, final fine adjustment may be performed by converting the two-dimensional image obtained by converting the three-dimensional model by affine conversion or the like such that the two-dimensional image coincides with the projection device viewpoint image after the optimal parameter is calculated.

INDUSTRIAL APPLICABILITY

The present disclosure enables accurate and easy execution of positioning when projection contents are projected to a three-dimensional projection target such as a building and enables simple implementation of set-up for projection mapping, which is industrially useful.

REFERENCE MARKS IN THE DRAWINGS

1 IMAGE PROCESSING APPARATUS
2 PROJECTION TARGET

3 CAMERA
4 PROJECTOR
5 COORDINATE CORRESPONDENCE CALCULATION UNIT
6 PROJECTION DEVICE VIEWPOINT IMAGE GENERATION UNIT
7 THREE-DIMENSIONAL MODEL UNIT
8 PARAMETER CALCULATION UNIT
9 THREE-DIMENSIONAL MODEL DEPICTION UNIT
10 OVERLAID IMAGE CREATION UNIT
11 DISPLAY DEVICE
12 INPUT DEVICE
13 PROJECTION IMAGE CREATION UNIT

The invention claimed is:

1. An image projection method for projecting an image to a three-dimensional projection target, the method comprising:
acquiring a projection device viewpoint image that is generated from an image captured by a camera and that includes the three-dimensional projection target;
preparing a three-dimensional model corresponding to the projection target as projection contents;
converting the three-dimensional model into the two-dimensional image such that the three-dimensional model coincides with the three-dimensional projection target included in the projection device viewpoint image; and
projecting the two-dimensional image to the projection target.

2. The image projection method of claim 1, wherein the converting of the three-dimensional model into the two-dimensional image that coincides with the projection device viewpoint image includes matching points on the three-dimensional model with corresponding points on the three-dimensional projection target included in the projection device viewpoint image.

3. The image projection method of claim 1, wherein the acquiring of the projection device viewpoint image of the three-dimensional projection target includes using a spatial coding method using a projection device and an imaging device.

4. The image projection method of claim 3, wherein the converting of the three-dimensional model into two-dimensional image that coincides with the projection device viewpoint image includes matching points on the three-dimensional projection target included in the three-dimensional model with points on the projection device viewpoint image.

5. The image projection method of claim 4, wherein the points on the three-dimensional projection target included in the projection device viewpoint image corresponding to the points on the three-dimensional model are designated by feature point matching.

6. The image projection method of claim 4, wherein a graphic user interface is used in order to match the points on the three-dimensional model with the corresponding points on the three-dimensional projection target included in the projection device viewpoint image.

7. The image projection method of claim 6, wherein the points on the three-dimensional projection target included in the projection device viewpoint image corresponding to the points on the three-dimensional model are designated by an operator via the graphic user interface.

8. The image projection method of claim 6, wherein the points on the three-dimensional projection target included in the projection device viewpoint image corresponding to the points on the three-dimensional model are designated by feature point matching.

9. The image projection method of claim 1, wherein a plurality of two-dimensional images are generated by acquiring a plurality of projection device viewpoint images and converting the projection device viewpoint images such that the individual projection device viewpoint images and the three-dimensional model as the projection contents coincide with each other, and the plurality of two-dimensional images are projected to the projection target by respectively corresponding projectors.

10. The image projection method of claim 1, further comprising:
receiving a user input via a graphic user interface for coinciding the three-dimensional model with the three-dimensional projection target included in the projection device viewpoint image.

11. An image projection apparatus for projecting an image to a three-dimensional projection target, the apparatus comprising:
a calculator configured to
acquire a projection device viewpoint image that is generated by an image captured by a camera and that includes the three-dimensional projection target,
prepare a three-dimensional model corresponding to the projection target as projection contents, and
convert the three-dimensional model into the two-dimensional image such that the three-dimensional model coincides with the three-dimensional projection target included in the projection device viewpoint image; and
a projector configured to project the two-dimensional image to the projection target.

12. The image projection apparatus of claim 11, wherein the calculator configured to receive a user input via a graphic user interface for coinciding the three-dimensional model with the three-dimensional projection target included in the projection device viewpoint image.

* * * * *